United States Patent Office 3,466,141
Patented Sept. 9, 1969

3,466,141
PROCESS FOR THE PRODUCTION OF
SODIUM PHOSPHATES
Iuliu Moldovan and Marinela Man, Bucharest, Rumania, assignors to Ministerul Industriei Chimice, Bucharest, Rumania, a corporation of Rumania
No Drawing. Filed Feb. 14, 1967, Ser. No. 615,927
Claims priority, application Rumania, Feb. 22, 1966, 51,021
Int. Cl. C01b 25/30
U.S. Cl. 23—107    1 Claim

ABSTRACT OF THE DISCLOSURE

Sodium orthophosphates are produced from wet-process orthophosphoric acid by extracting the latter from aqueous solution with n-butanol and neutralizing the extract with sodium carbonate or hydroxide to a pH of 4.5 to 4.6 for monosodium phosphate, 8.5 to 8.6 for disodium phosphate and 11.2 to 11.3 for trisodium phosphate, the neutralization being carried out at a temperature of 50 to 60° C. due to the generated heat of reaction and being followed by a drying of the resulting phosphate crystals in a hot gas current.

---

This invention relates to a process for the manufacture of sodium orthophosphates of high purity in anhydrous form.

At present, mono-, di- and trisodium phosphates are obtained either from electrothermic phosphoric acid or from wet-process phosphoric acid by neutralization with $Na_2CO_3$ or NaOH. By this process, however, the phosphates are obtained as crystal hydrates, the elimination of the water of crystallization being a difficult and expensive operation. Furthermore, when wet-process phosphoric acid is employed, its previous purification of iron, aluminum and fluorine impurities is necessary, because these impurities may precipitate as orthophosphates or fluosilicates and produce the gelation of the solutions, hindering the crystallization.

Another known process for the preparation of pure alkali phosphates comprises the extraction of wet-process phosphoric acid from its aqueous solution by an aliphatic alcohol having 4 to 12 carbon atoms with addition of amines, and the treatment of the organic extract directly with a base such as sodium hydroxide or carbonate, in the presence or in the absence of water. In the first case, a solution of salts is obtained, which has to be concentrated; in the second case the salt separates as crystals. This process does not, however, yield individual precipitation of the phosphates, so that its application leads to a mixture of salts.

The present invention eliminates these disadvantages, since the neutralization of the organic extract is carried out at temperatures of 50 to 60° C. and at pH=4.5 for for the formation of monosodium phosphate, at pH=8.2 for the disodium phosphate and at pH=11.2 for the trisodium phosphate.

The following three examples illustrate the practice of this invention:

EXAMPLE 1

Wet-process orthophosphoric acid containing about 30% $P_2O_5$ is extracted with n-butanol in a ratio solvent: acid of 1.5:1 by volume, in an agitator-decanter with 9 extraction units; 100 g. of the organic extract, having the following composition: 16.3% $H_3PO_4$, 0.1% $SO_4$, 0.176% F, 0.016% $Fe_2O_3$, 0.008% $Al_2O_3$, 60.3% n-butanol and 22.9% $H_2O$, are neutralized under stirring with 8.8 g. $Na_2CO_3$ at a pH=4.5 to 4.6 and at the temperature of 50 to 60° C. resulting from the reaction, in a system with reflux of the solvent. The solvent with a content of about 14% $H_2O$ is separated from the crystals by decantation and centrifugation; 26.2 g. wet monosodium orthophosphate is obtained, still containing 6 g. water and 0.2 g. butanol, but without water of crystallization. This phosphate is dried in a current of hot gases, at a temperature of 80 to 90° C., to a moisture content of 0.5%. Crystals of monosodium orthophosphate are obtained, with a purity of 99.8%, and containing 0.002% Fe, 0.15% F, 0.1% $SO_4$ while being free of arsenic and heavy metals. The hot gases are then cooled for the recovery of the solvent, which together with the solvent retrieved from the decantation-centrifugation stage is rendered anhydrous by any of the known processes.

EXAMPLE 2

The operations are similar to those in Example 1, with the difference that the extract is neutralized with 17.6 g. $Na_2CO_3$ at pH=8.5 to 8.6 and at a temperature of about 60° C. resulting from the reaction. Disodium phosphate is obtained, with a purity of 99.8% and containing 0.002% Fe, 0.1% $SO_4$, free of arsenic and heavy metals.

EXAMPLE 3

The operations are similar to those in Example 2, with the difference that after reaching pH=8.5 to 8,6, the neutralization is continued up to pH=11.3 by addition of 7.2 g. NaOH, in order to replace the third hydrogen ion of the orthophosphoric acid. The operation is carried out at the temperature of 60 to 65° C. resulting from the reaction, in a system similar to that in Example 1. The trisodium phosphate obtained has a purity of 99.8% and the same impurities content as the mono- and di-sodium phosphates.

The process according to the invention presents the following advantages:

(a) It enables the production of sodium orthophosphates of a purity comparable to that of products obtained from electrothermic phosphoric acid; and (b) The sodium orthophosphates are produced in anhydrous form, the stage of elimination of the water of crystallization being thus rendered superfluous.

What we claim is:

1. A process for producing anhydrous crystals of a sodium orthophosphate, comprising the steps of:
    extracting wet-process orthophosphoric acid from an equeous solution by means of n-butanol;
    neutralizing the extract with sodium carbonate or sodium hydroxide, at a temperature between 50° and 60° C. resulting from the heat of reaction, to a selected pH of 4.5 to 4.6 for producing monosodium orthophosphate, of 8.5 to 8.6 for producing disodium orthophosphate and of 11.2 to 11.3 for producing trisodium orthophosphate to cause separation of the corresponding sodium orthophosphate in the form of wet crystals free from water of crystallization; and drying said wet crystals in a current of hot gases with recovery of a residue of said n-butanol.

References Cited

UNITED STATES PATENTS 1,929,443  10/1933  Milligan _____ 23—107
2,811,419  10/1957  Hartlapp et al. _____ 23—107

OTHER REFERENCES

Van Wazer, vol. II, Phosphorus and Its Compounds, Technology, Biological Functions and Applications, Interscience Publishers, Inc., New York and London (1961).

OSCAR R. VERTIZ, Primary Examiner
HOKE S. MILLER, Assistant Examiner

U.S. Cl. X.R.
23—165

UNITED STATES PATENT OFFICE
CERTIFICATE OF CORRECTION

Patent No. 3,466,141      Dated September 9, 1969

Inventor(s) Iuliu MOLDOVAN and Marinela MAN

It is certified that error appears in the above-identified patent and that said Letters Patent are hereby corrected as shown below:

Column 2, line 45 (claim 1, line 4)

The work "equeous" to read -- aqueous -- .

SIGNED AND SEALED
OCT 6 - 1970

(SEAL)
Attest:

Edward M. Fletcher, Jr.
Attesting Officer

WILLIAM E. SCHUYLER, JR.
Commissioner of Patents